US006625257B1

(12) United States Patent
Asaoka et al.

(10) Patent No.: US 6,625,257 B1
(45) Date of Patent: Sep. 23, 2003

(54) MESSAGE PROCESSING SYSTEM, METHOD FOR PROCESSING MESSAGES AND COMPUTER READABLE MEDIUM

(75) Inventors: Taizo Asaoka, Toyota (JP); Hiroyuki Kanemitsu, Shizuoka (JP); Naoki Maeda, Toyota (JP); Masanobu Yamashita, McLean, VA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/126,721

(22) Filed: Jul. 31, 1998

(30) Foreign Application Priority Data

Oct. 9, 1997 (JP) .............................................. 9-277775
Jul. 31, 1997 (JP) .............................................. 9-205615

(51) Int. Cl.$^7$ .......................... H04M 1/64; H04M 11/00
(52) U.S. Cl. .............................. 379/88.01; 379/88.02; 379/88.05; 379/88.07; 379/88.13; 379/88.16; 379/71; 379/76
(58) Field of Search .......................... 379/88.01–88.02, 379/88.07, 88.16, 88.17, 88.13, 67.1, 71, 76; 701/27, 202, 209, 98, 211, 214, 301; 704/243, 246, 260, 270, 272, 275, 278; 455/70, 500, 517

(56) References Cited

U.S. PATENT DOCUMENTS

| 5,148,153 A | | 9/1992 | Haymond |
| 5,214,793 A | * | 5/1993 | Conway et al. ............. 455/49.1 |
| 5,400,393 A | * | 3/1995 | Knuth et al. .................. 379/88 |

(List continued on next page.)

FOREIGN PATENT DOCUMENTS

| EP | 375817 | | 7/1990 | |
| EP | 0768632 A2 | * | 4/1997 | ............ G08G/1/09 |
| JP | 4-316100 A | | 11/1992 | |
| JP | 5-260082 | | 10/1993 | |
| JP | 6-276220 | | 9/1994 | |
| JP | 6-332822 | | 12/1994 | |
| JP | 7-177236 | | 7/1995 | |
| JP | 08285628 A | * | 1/1996 | ............ G01C/21/00 |
| JP | 8-63188 | | 3/1996 | |
| JP | 9-8752 | | 1/1997 | |
| JP | 9-23273 | | 1/1997 | |
| JP | 9-50286 A | | 2/1997 | |
| JP | 9-166450 A | | 6/1997 | |
| JP | 11-38996 A | | 2/1999 | |

*Primary Examiner*—Allan Hoosain
(74) *Attorney, Agent, or Firm*—Burns, Doane, Swecker & Mathis, LLP

(57) ABSTRACT

A message processing device is adapted to obtain text data and read aloud the text data aloud by using a voice synthesizer. A loudspeaker device is connected to the message processing device to output or read aloud the text data. The text data can be received through a receiving device that receives outside information data or e-mail message data. The voice synthesizer can be controlled by an outside information controller, with the outside information controller being able to distinguish senders of the text data and being able to select one voice tone data to read aloud messages sent by one sender. If the controller recognizes that there are other messages sent by another sender, the controller allots different voice tone data for the other sender's messages. The message processing device can include a voice navigation device to generate voice signals for giving route guidance messages or information to a driver of a vehicle. The voice tone used for the route guidance message is preferably different from the voice tone used to read aloud the outside information message. It is thus possible for the driver to recognize the source or senders of different messages being read aloud. It is also possible to adjust the output timing of the route guidance message and the outside information message.

21 Claims, 12 Drawing Sheets

U.S. PATENT DOCUMENTS

| | | | |
|---|---|---|---|
| 5,406,492 A | * 4/1995 | Suzuki | 364/499 |
| 5,857,170 A | 1/1999 | Kondo | 704/266 |
| 5,903,228 A | * 5/1999 | Ohgaki et al. | 340/995 |
| 5,911,129 A | * 6/1999 | Towell | 704/272 |
| 5,926,117 A | * 7/1999 | Gunji et al. | 340/988 |
| 5,950,161 A | * 9/1999 | Kozuma et al. | 704/260 |
| 5,983,161 A | * 11/1999 | Lemelson et al. | 701/301 |
| 5,987,382 A | 11/1999 | Weishaupt et al. | |
| 6,018,710 A | * 1/2000 | Wynblatt et al. | 704/260 |
| 6,021,181 A | * 2/2000 | Miner et al. | 379/88.23 |
| 6,289,085 B1 | 9/2001 | Miyashita et al. | |

* cited by examiner

FIG. 2

| No. | Sender | Date | Subject |
|---|---|---|---|
| 1 | Naomi ◇◇◇ | 1997. 7/10  22:07 | Thank you. |
| 2 | Naomi ◇◇◇ | 1997. 7/13  21:50 | Re: Thank you. |
| 3 | ○○ Tarobei | 1997. 7/15   8:19 | Sudden Business Trip |
| 4 | Naomi◇◇◇ | 1997. 7/16  23:00 | Re. Thank you. |
| 5 | △△moto●● kichi | 1997. 7/16  23:51 | Information of New Product |
| 6 | ○○ Tarobei | 1997. 7/17  13:09 | Re: Sudden Business Trip |
| 7 | Naomi◇◇◇ | 1997. 7/17  20:46 | How about tomorrow? |

28: Telephone System

MESSAGE PROCESSING SYSTEM, METHOD FOR PROCESSING MESSAGES AND COMPUTER READABLE MEDIUM

This application corresponds to and claims priority under 35 U.S.C. §119 with respect to Japanese Patent Application No. Hei-9-205615 filed on Jul. 31, 1997 and Japanese Patent Application No. Hei-9-277775 filed on Oct. 9, 1997, the entire content of both applications being incorporated herein by reference

FIELD OF THE INVENTION

The present invention generally relates to a device and method for processing messages. More particularly, the present invention pertains to a device and method for use in, for example, a vehicle for processing messages sent from outside, such as electronic mail (e-mail), news information, weather information, traffic information and messages generated by the vehicle navigation system, through the use of a read aloud function.

BACKGROUND OF THE INVENTION

Communication systems which utilize computer networks have become increasingly popular in recent years. In addition, mobile communication systems which are able to exchange electronic mail messages (e-mail messages) through the use of a portable computer, PDA (Personal Digital Assistant), an on-vehicle computer or other portable communication devices have been proposed. A device which reads messages aloud has also been proposed to help a user, for example a vehicle driver, understand the contents of the messages without looking at a display.

Japanese Patent Laid-Open Publication No. Hei 9-23273 describes a device that can read e-mail messages aloud. The device is able to compose e-mail messages and send them to other terminals, and is also able to receive e-mail messages sent from other terminals. The device has a voice synthesizer to generate voice signals from a loudspeaker in accordance with the text data of the received e-mail messages. By generating voice signals the user can understand the contents of the e-mail messages without viewing a display device. The device is also outfitted with a voice navigation device to generate voice guidance messages, for example where the vehicle should turn, to guide the driver along a route to a particular destination.

However, the device described above is susceptible of certain limitations and drawbacks. For example, when the device receives messages from different sources or senders and reads those messages aloud in the same voice tone, the user cannot easily recognize whose message is being read reading aloud. Even if a first message from one person has been read aloud and a second message from another person is beginning to be read aloud, it isn't easy for the user to understand the end of the first message and the start of the second message because the two messages are read in the same voice tone. Therefore, the user may confuse the sender of each message unless the user confirms, through visual observation of the display, who sent the message.

Thus, one of the drawbacks and disadvantages associated with this device is that the device reading the message is not well suited to distinguishing between the messages from different sources or senders and so the user may misunderstand the source or sender of a particular message.

Thus, a need exists for a system that can process messages and provide an audio read-out of such messages in a way that allows the user to readily discern different messages from different sources or senders.

A need also exists for such a system that allows the user to readily discern different messages from different sources or senders.

It would also be desirable to provide a system that includes a read aloud device and a voice navigation device, wherein the system allows the user to easily understand which device is generating a given message.

A further need exists for a system that includes a read aloud device and a voice navigation device, wherein the system prevents the user from simultaneously hearing one message of the navigation device and another message of the reading-aloud device.

SUMMARY OF THE INVENTION

According to one aspect of the invention, a message processing device includes a receiving device that receives sent messages, a voice tone memory which stores a plurality of different voice tones, and an allotting device which allots one of the voice tones stored in the voice tone memory to at least one message received by the receiving device and allots a different voice tone stored in the voice tone memory to another message received by the receiving device. The system then reads aloud the one message in the one voice tone and reads aloud the other message in the different voice tone.

Another aspect of the present invention involves a message processing device for a vehicle that includes a receiving device for receiving outside information sent from outside, a navigation controller for providing voice guidance information to guide the driver of the vehicle, and a device for allotting one voice tone to the outside information and for allotting a different voice tone to the voice guidance information.

An additional aspect of the present invention involves a message processing device for a vehicle that includes a receiving device for receiving outside information sent from outside, a voice tone memory for storing plural different voice tones, and a voice reader for reading aloud the outside information by using one voice tone stored in the voice tone memory. A voice navigator providing voice guidance information to the driver of the vehicle and an adjusting device adjusts the output timing of when the voice guidance information is read aloud and when the electrical information is read aloud to prevent the voice guidance information and the electrical information from being read aloud simultaneously.

Another aspect of the present invention pertains to a message processing method that involves receiving messages sent from outside, allotting one voice tone to at least one of the messages and allotting a different voice tone to a different message, and then reading aloud the one message in the one voice tone and reading aloud the different message in the different voice tone.

According to another aspect of the invention, a message processing method used in a vehicle involves receiving outside information from an outside source, reading aloud the outside information using a first voice tone, and reading aloud voice guidance information to a driver of the vehicle to facilitate navigation of the vehicle through use of a second voice tone that is different from the first voice tone.

Another aspect of the invention involves a message processing method for use in a vehicle that includes receiving outside information sent from an outside source, reading aloud the outside information and reading aloud voice guidance information to a driver of the vehicle to provide guidance for driving the vehicle. The timing of when the outside information and the voice guidance information are read aloud is adjusted to prevent the outside information and the voice guidance information from being read aloud at the same time.

According to a still further aspect of the invention, a computer readable medium includes a message processing program that receives a message from an outside source, reads aloud the message from the outside source using a first voice tone, and reads aloud a message from a second source different from the outside source using a second voice tone that is different from the first voice tone.

In accordance with another aspect of the invention, a computer readable medium includes a message processing program that receives outside information messages sent from an outside source, reads aloud the outside information messages, and reads aloud voice guidance information to a driver of a vehicle to provide guidance information for driving the vehicle. The message processing program adjusts the output timing for reading aloud the outside information messages and the output timing for reading aloud the voice guidance information to prevent the outside information messages and the voice guidance information messages from being read aloud at the same time.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein:

FIG. 2 is an example of a received electronic mail-message list;

DETAILED DESCRIPTION OF THE INVENTION

Figure 1:
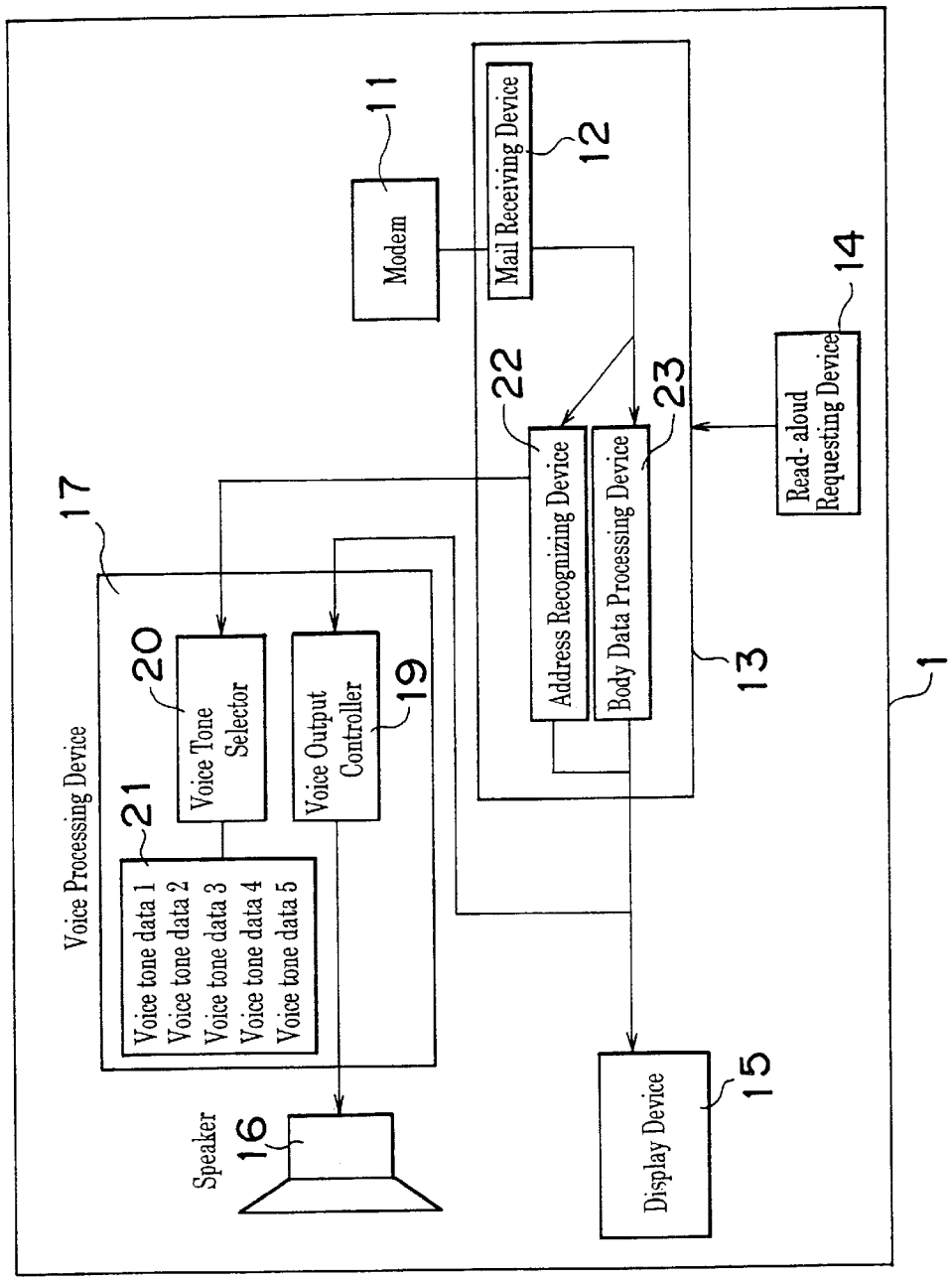
FIG. 1 is a block diagram illustrating a mobile terminal device related to a first embodiment of the present invention.

FIG. 1 is a block diagram illustrating the configuration of a mobile terminal in accordance with a first embodiment of the present invention. The mobile terminal is designed to read aloud messages and can be in the form of a Personal Digital Assistant (PDA) which is a type of portable terminal, a notebook-type personal computer, an in-vehicle information terminal, or other types of devices. In addition, various components of the mobile terminal, for example a display monitor, a central processing unit (CPU), a memory, etc, can also be used in other contexts such as in relation to a vehicle navigation system.

The mobile terminal 1 includes a display device 15 for outputting or displaying information in a visual form, and a loudspeaker device 16 for outputting information in an audio manner. The display device 15 can be in the form of a color LCD (Liquid Crystal Display). The mobile terminal 1 also includes a modem 11 that is adapted to be removably connected to a telephone system, for example a mobile phone, a car phone system, a PHS (Personal Handy-phone System), etc. Such a telephone system can be included in the mobile terminal 1 instead of being removably connected.

The modem 11 is designed to communicate with a mail processing device 13 that includes a mail receiving device 12 for receiving electronic mail (e-mail) message data, an e-mail address recognizing device 22 for recognizing the address of the e-mail sender, and a body data processing device 23 for processing the body or text of the e-mail message data. The mail receiving device 12 is connected to the modem 11 as well as the e-mail address recognizing device 22 and the body data processing device 23. The mail processing device 13 receives e-mail data sent to it after the mobile terminal 1 activates its processing program for receiving e-mail message data.

The mobile terminal 1 can be connected with an e-mail server in an on-line information center by using the telephone system, and can receive e-mail message data sent to it. The e-mail message data received by the mail receiving device 12 is sent by the mail receiving device 12 through the modem 11. The mail receiving device 12 demodulates and decodes the e-mail message data, and the decoded e-mail data in the mail receiving device 12 is supplied to the address recognizing device 22 and the body data processing device 23. Each e-mail message data includes the sender's address data, time and date information data concerning when the e-mail was sent, the subject data, and the body or text data of the message. The e-mail data in itself is coded data, so the address recognizing device 22 and the body data processing device 23 are designed to change the coded data into recognizable text data or character data or drawing data for display by using their reference dictionary database.

Therefore, list data setting forth a list of received mail such as that shown in FIG. 2 or body data setting forth the text associated with each e-mail message are displayed on the display device 15.

As further seen in FIG. 1, the mobile terminal 1 also includes a read-aloud requesting device 14 which is operated by the user. When the user operates the read-aloud requesting device 14, the terminal 1 is placed in its read-aloud mode. For example, a touch-switching system can be used as the read-aloud requesting device 14. When the e-mail reception program is started, the touch switch is displayed on the display device 15 and the terminal 1 can be changed if the user touches the displayed touch switch.

When the in-vehicle information terminal serves as the mobile terminal, it is preferable that the read-aloud mode be started automatically when the vehicle is turned on or begins to run. Of course, speed signals indicating that the vehicle is moving can be monitored to determine when the read-aloud mode should be started.

While in the read-aloud mode, the decoded mail data is supplied to a voice processor device 17. This voice processor device 17 includes a voice output controller or voice synthesizer 19, a voice tone selector 20 that is connected to or interfaces with the voice output controller 19, and a voice tone data memory 21 that is connected to or interfaces with the voice tone selector 20. The sender's address data, the time and date information data, the subject data and the body data are sent from the mail processing device 13 to the voice output controller 19. That data is changed into voice signals for being read aloud, and finally the voice signals are emitted from the loudspeaker 16 which is connected to the voice output controller 19.

The address recognition device 22 detects the sender of each e-mail message by recognizing the sender's address. If there are plural senders in all of the received messages, the address recognition device 22 associates distinctive numbers for each sender. The distinctive numbers are also supplied to the voice tone selector 20. The voice tone selector 20 reads or allots one voice tone or voice tone data corresponding to the distinctive number from the voice tone data memory 21. In this embodiment, there are five audibly different patterns of voice tones in the voice tone data memory 21, although a different number of voice tone patterns can be provided. The distinctive number for distinguishing between each voice tone data is allotted to the message from each sender. Then, a specified voice tone data is supplied to the voice output controller 19. Therefore, each received mail is read aloud in the specified voice tone data allotted by the voice tone selector 20.

To produce the voice tone data that is stored in the voice tone memory 21, different individuals can read actual predetermined texts, words or sentences which are then sampled. A different person would preferably be used to produce each of the different voice tones. Then, all sampled voice tones are encoded by some ordinal method, for example PCM coding. The voice tone memory 21 stores such PCM-coded voice tone data. Any person's voice can be used, for example a high tone male voice, a low bass male voice, a high tone female voice, a low female voice, a child's voice, etc. In addition to or as an alternative to a person's voice, a computer synthesized voice, similar to a robot voice, can also be used. The voice tones are distinguishable from one another as heard by the user.

Figure 3A:
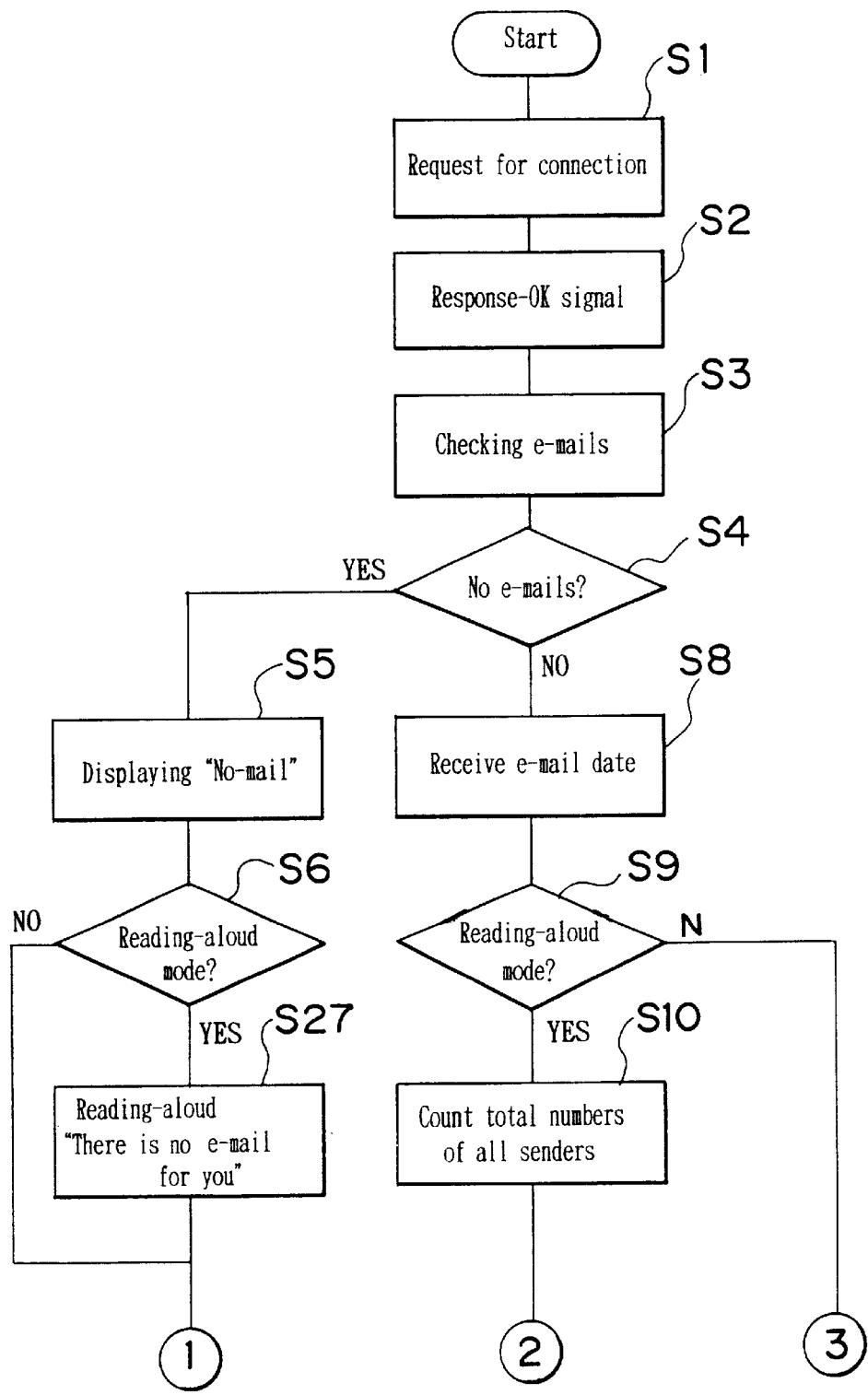
FIG. 3 is a flow chart illustrating a program process carried out in connection with operation of the first embodiment of the present invention for allotting different voice tones to messages received from different senders.
Figure 3B:
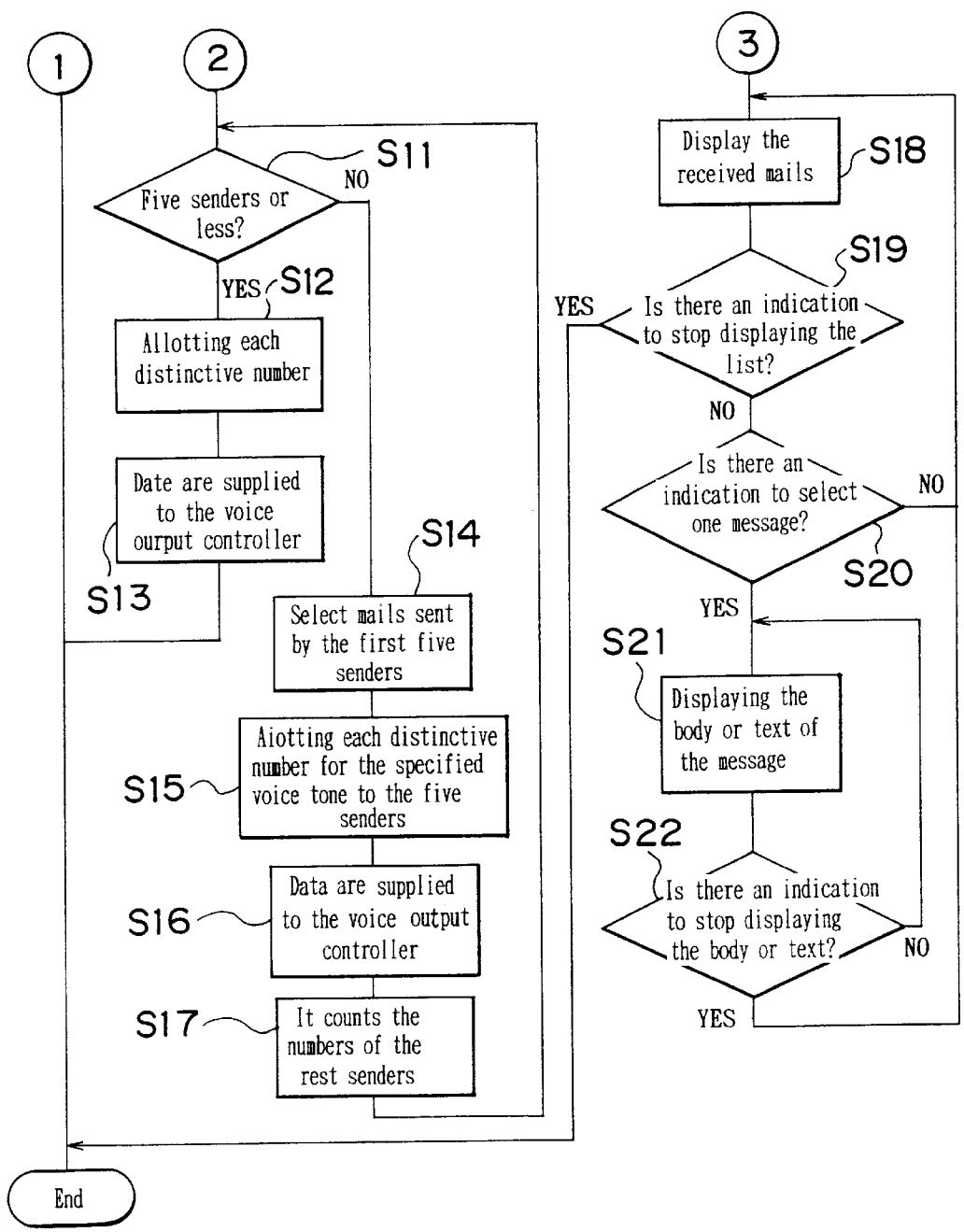

FIG. 3A and FIG. 3B show a processing flowchart by which the system receives e-mail messages and reads them aloud. At step S1 in FIG. 3A, when the user receives e-mail messages, a request signal is first generated to connect with an on-line service center. The telephone system calls up the on-line service center after receipt of the requesting signal. When a mail server replies to the request signal, the server sends a response signal. When the response signal is detected, a response-OK signal is generated in step S2 indicating that the server has responded to its request. Following this response-OK signal, in step S3 the mobile terminal generates an indicating signal for starting to check sent e-mail messages. After that, the receipt of e-mail messages from the server begins.

In step S4, it is determined whether or not any e-mail messages have been received. If there is no e-mail in the server, a message such as "No e-mails" is displayed on the display device 15 in step S5. Thereafter, in step S6, it is determined whether or not the system is in the reading-aloud mode. If the system is in the reading-aloud mode, an indicating signal is generated for making the voice output controller 19 read aloud a message such as "there is no e-mail for you". After reading this message aloud, the process is finished. If the result in step S6 is No (i.e., the system is not in the reading-aloud mode), the process ends without reading anything aloud.

If, at step S4, it is determined that there are one or more e-mail messages present, the program proceeds to step S8 where the e-mail data is received. Then, in step S9, it is determined whether or not the system is in the reading aloud mode. If the system is in the reading aloud mode, the total number of mail senders in all of the received e-mail messages is counted in step S10. Then, in step S11, it is judged whether or not the total number of senders is five or less.

In the example of a list of received e-mail messages shown in FIG. 2, there are seven messages, but the seven messages are sent by three persons—Naomi, Tarobei, and moto kichi. Thus, the total number of senders is three and so in this example, the system would judge Yes in step S11. If the system determines in step S11 that there are five or fewer senders, a distinctive number for a specified voice tone data is allotted to each sender in step S12. After that, relation data defining the relationship between the senders and the associated distinctive number is supplied to the voice output controller 19 in step S13.

If the determination at step S11 is No, in other words if the total number of different senders is more than five, the system detects in step S14 the first five senders and selects all e-mail messages sent by the first five senders. In step S15, a distinctive number for the specified voice tone data is allotted to each of the first five senders. The distinctive numbers are supplied to the voice data selector 20 and the body or content data is supplied to the voice output controller 19 in step S16. Therefore, a different voice tone data is allotted to each sender and each message sent by a particular sender is supplied to the voice output controller 19 in step S16. Consequently, the reading-aloud voice tone for each sender's mail is different from one sender to the next when the system reads aloud all of the messages sent by the first five senders.

In step S17, the number of remaining senders beyond the aforementioned five are counted, and then the program returns to step S11. Thus, the remaining messages are processed in the same way. In other words, if there are many senders in the received mail list (i.e., more than five senders), the five voice tone data stored in the voice tone memory are allotted to the first five senders, and for the remaining senders, the same stored voice tone data is repeatedly allotted. Thus a reading-aloud unit can be restricted to five senders, and in each unit each sender's mails are read aloud using different voice tones.

If it is determined at step S9 that the system is not in the reading aloud mode, the received mail list, such as shown in FIG. 2, is displayed on the display device 15 in step S18. Then, the system determines in step S19 whether or not there is an indication to stop displaying the list. If there is an indication in step S19 to stop displaying the list, in other words if the determination in step S19 is Yes, the program ends. However, if the determination at step S19 is No because there is no indication that the display of the list should stop, the program proceeds to step S20 to determine whether or not there is an indication to display the full text or body data of one selected mail message. If the determination in step S20 is Yes, the full text or body data is displayed on the display device 15 in step S21. After that, the full text data continues to be displayed so long as there is no indication to stop displaying such data in step S22. When there is a indication in step S22 to stop displaying the full text data, the display device 15 shows the received mail list again after returning to step S18.

If the determination in step S20 is No, the list is also displayed continuously after returning to the S18.

According to this first embodiment of the present invention, the system can change the voice tone for reading aloud e-mail messages when messages from different senders are prepared for being read aloud. The user can thus easily understand whether or not a message being read aloud is one that was sent by a sender whose messages have been already read aloud.

Of course, it is possible to use a voice tone to read aloud the received mail list or to use different voice tones to read aloud the different received mail items on the received mail list.

In connection with this embodiment, it may be useful for the system to memorize for a predetermined period of time the data defining the relationship between the senders and the distinctive number associated with each sender. Thus, if a particular sender sends e-mail messages repeatedly within the period, the previously assigned distinctive number is associated with that sender. This allows the one sender's messages to be read aloud repeatedly in the same voice tone. In this case, it is preferable that there be a sufficient number of different kinds of voice tone data in the voice tone memory 21. It is also possible that the distinctive numbers are registered or assigned for certain predetermined senders by the user beforehand. The user can thus decide which voice tone data is assigned to the predetermined senders, thus making it easier for the user to recognize the sender whose messages are being read aloud when the user hears the voice tone.

It may occur that the data format of the voice tone memory is standardized and also that the relationship between the distinctive number and the voice tone is standardized. In such a situation, the sender may be able to send his e-mail messages with the above distinctive number. When such a person's e-mail messages are read aloud at the terminal after recognizing the distinctive number attached or chosen by the sender, the voice tone can be selected as the sender likes. This thus promotes personalization of the voice tone used for reading aloud messages. It is also preferable that the voice tone memory be capable of being updated for personalizing the read-aloud voice tone. Additional voice tone data can be supplied by PCM card medium or CD-ROMs. Also, an on-line network may be useful when an on-line service center which can supply additional voice tone data is established. In addition, the e-mail server can be designed to allot or control the voice tones.

Although some examples of installing the voice tone memory in the mobile terminal have been shown, the mobile terminal itself need not always comprise such a voice tone database. The sender can send each e-mail message with a voice tone data and the terminal can then read the message aloud by using the voice tone data attached to each message. It is also possible for the e-mail server to include a voice tone database and be capable of assigning voice tone data to messages, with the terminal receiving the voice tone data for being read aloud when the terminal receives e-mail messages.

Of course, the e-mail server may be designed to only assign a distinctive number for voice tone data without also including the voice tone data itself. In such a situation, the mobile terminal will then have to be outfitted to include the voice tone database and be able to associate voice tones to the assigned distinctive number.

The mail processing device 13 and the voice processing device 17 described above are constituted by a computer system and are controlled by controlling programs in the computer system. Therefore, all processes are generally maintained by running the predetermined program. This program may be pre-installed on the computer system, or may be supplied to the computer system through an on-line network or some medium like a CD-ROM, for example. The mobile terminal shown in FIG. 1 is one which can be installed on a vehicle, but can also be one that is hand-held.

Figure 4:
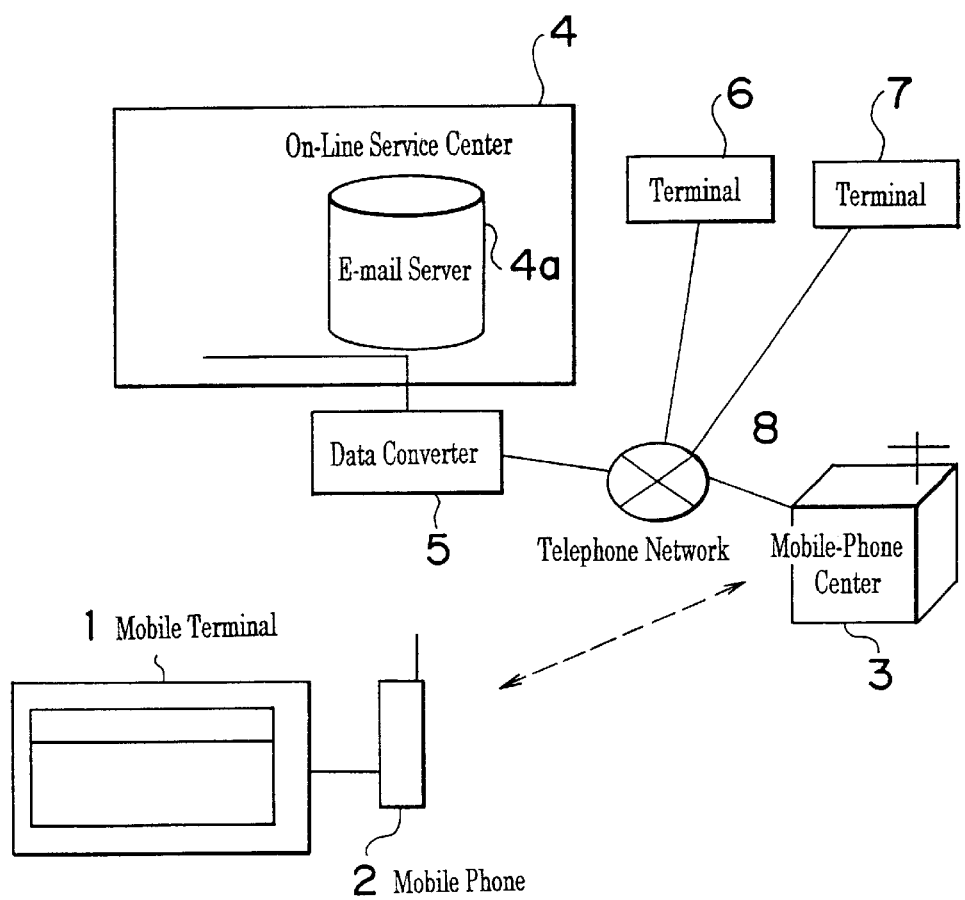
FIG. 4 is a system diagram illustrating the overall structure of the electronic mail system.

FIG. 4 illustrates general features of one example of an overall e-mail system in which can be incorporated the mobile terminal shown in FIG. 1. The mobile terminal 1 is connected to the mobile phone 2 which is able to access a mobile-phone center 3. The mobile-phone center 3 is connected to the public telephone network 8. Each terminal 6, 7 is also connectable to the telephone network 8. The terminals 6, 7 can be in the form of, for example, desk-top computers. An on-line service center 4 is also connected to the network 8 through a data converter 5. The on-line service center 4 includes an e-mail server 4a. The mobile terminal 1 is able to receive e-mail messages sent to itself from other terminals after accessing the e-mail server 4a. The mobile-phone center 3 preferably includes many communication cells over a wide area. If the mobile terminal 1 moves within the wide area, it can maintain connection to the online service center 4 because the mobile terminal 1 can change from one cell to another.

Figure 5:
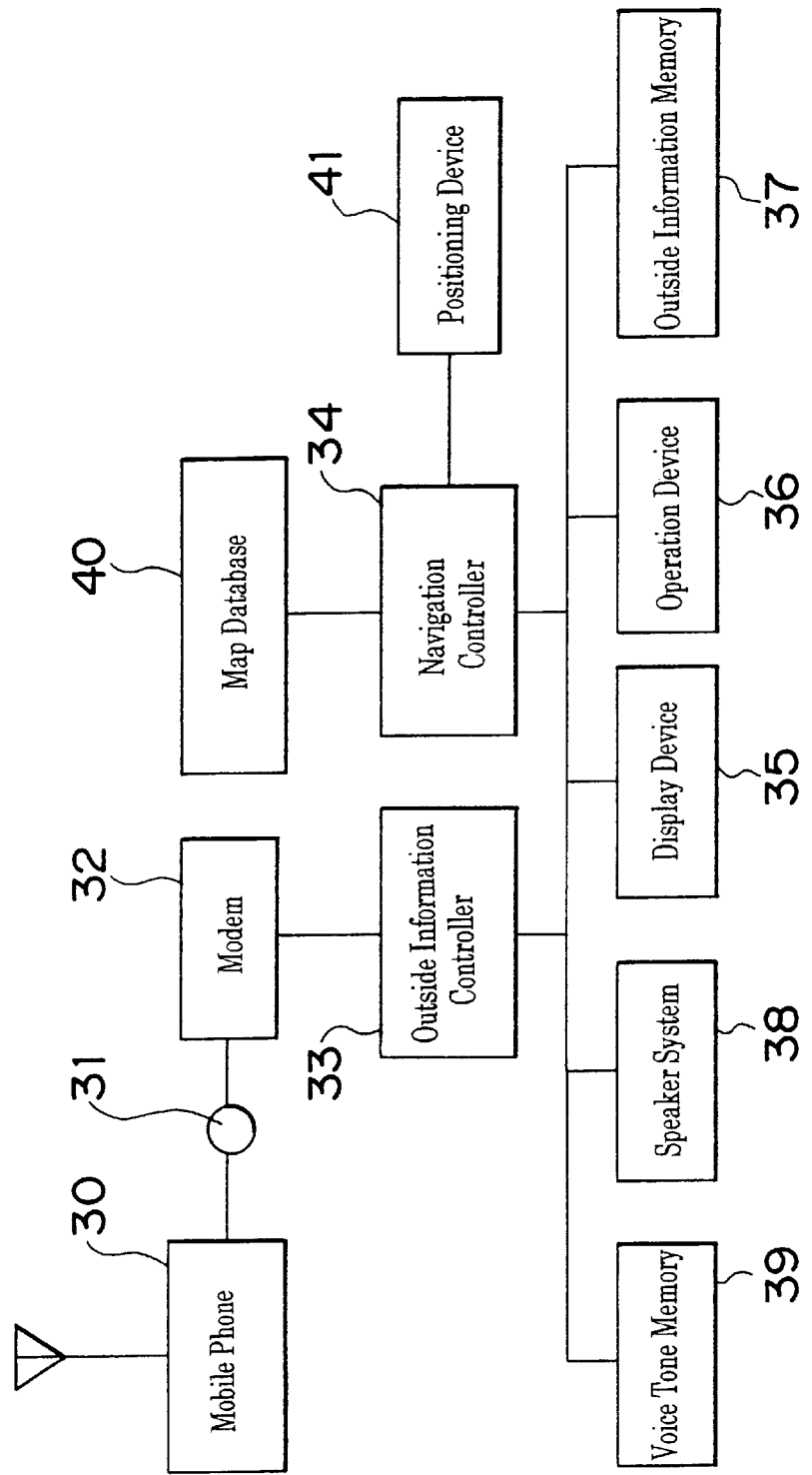
FIG. 5 is a block diagram illustrating the configuration of a system in accordance with a second embodiment of the present invention.

Another embodiment of the present invention is depicted in FIG. 5 which sets forth a block diagram showing the configuration of the mobile terminal device. The system shown in FIG. 5 is similar to that shown in FIG. 1, but also includes vehicle navigation capabilities and is particularly well suited for use in a vehicle. The system or device shown in FIG. 5 includes a mobile phone 30 similar to the mobile phone 2 shown in FIG. 4 that is connectable to the public telephone network by wireless communication. An on-line service, not specifically shown in FIG. 5, is also connected to the network. Also, satellite communication may be available. The mobile phone 30 is connected to a modem 32, which is similar to the modem 11 shown in FIG. 1, through a connector 31 so that the mobile phone 30 can maintain data communication.

The modem 32 is connected to an outside information controller 33. This outside information controller 33 processes the transmission or reception of outside information such as e-mail messages, news of various kinds, advertising messages, traffic information, weather information, facilities information, business information, sightseeing information, etc. Also, the outside information controller 33 performs processing relating to the display or voice output of such information. The outside information controller 33 is similar to the mail processing device 13 shown in FIG. 1, except that in addition to processing e-mail information, the outside information controller 33 also processes other information such as that mentioned above.

A navigation controller 34 is connected to the outside information controller 33. The navigation controller 34 performs processing to display maps, to provide route guidance information or to generate guidance. Both the outside information controller 33 and the navigation controller 34 are connected to a display device 35, an operating device 36, an outside information memory device 37, a loudspeaker system 38 and a voice tone data memory device 39 through the Local Area Network. The display device 35, similar to the display device is shown in FIG. 1, can be in the form of a liquid crystal display and is designed to display map information or various kinds of text data. The operating device 36 is similar to the read-aloud requesting device shown in FIG. 1, except that the operating device has greater capabilities. The operating device 36 is composed of several switches and a touch panel installed in the front of the display device 35. The operating device 36 is operated by the user to input information of various kinds.

The outside information memory 37 is similar to the mail receiving device 12 depicted in FIG. 1 except that it is adapted to store a variety of different information beyond e-mail information. The outside information memory 37 memorizes data concerning e-mail messages containing text, the e-mail lists, various kinds of news information or any other outside information. The output from the loudspeaker 38, which is similar to the speaker 16 in FIG. 1, reads aloud the received e-mail messages, the news information or the guidance messages for navigation. The voice tone memory 39 memorizes voice tone data of several different kinds and is similar to the voice tone memory 21 in FIG. 1.

A map database 40 and a positioning device 41 are connected to the navigation controller 34. The map database 40 memorizes data concerning the map of an entire area, for example a country. The map database 40 also memorizes various guidance information, for example the names of place, the names of intersections, various kinds of facility names or the names of shops, and message data involving various guidance phrases. The positioning device 41 can detect its present position at all times. This positioning device 41 can include a GPS receiver to receive wireless signals from GPS satellites around the globe. The D-GPS (Differential Global Positioning System) can also be used in connection with the positioning device 41. In addition, the positioning device 41 can include the well-known dead-reckoning device or the absolute coordinates information receiver to acquire more precise position data.

In this system shown in FIG. 5, the various functions and operations such as route searching for a destination, position display, searched route display, the driver guidance, etc., are performed in a manner similar to an ordinary navigation device. Before the vehicle reaches an intersection where the vehicle must turn right or left, the navigation controller 34 reads out guidance message data from the map data base 40. The navigation controller 34 then provides data for the voice output by making use of the voice tone data memorized in the voice tone memory 39 and finally outputs the data for the voice output from the loudspeaker 38. As a result, the guidance message is output from the loudspeaker 38 based on the voice tone which is memorized in the voice tone memory 39.

When the outside information controller 33 receives e-mail messages sent from the outside, the outside information controller 33 first receives the messages through the mobile phone 30, the connector 31 and the modem 32. The outside information memory 37 then memorizes the messages. The outside information controller 33 updates the list of received e-mail messages which are memorized in the outside information memory 37. The outside information controller 33 displays the list of received e-mail messages, or the body or text of such e-mail messages, on the display device 35, and then outputs these from the loudspeaker 38 with the read-aloud voice. When the outside information controller 33 outputs voice data concerning the e-mail messages, the outside information controller 33 provides data for the voice output by making use of the voice tone data which is memorized in the voice tone memory 39 and finally outputs the data for the voice output from the loudspeaker 38. When the outside information controller 33 acquires or receives news or any other information from an outside source, the outside information controller 33 performs processing in the same way as in the case of e-mail messages.

It is particularly useful in this embodiment that the voice tone memory 39 memorizes PCM data based on a male's voice and also memorizes PCM data based on a female's voice. If the male voice PCM data is used for or assigned to the outside information controller 33, the female voice PCM data is available for or assigned to the navigation guidance messages. Of course, the opposite association can be employed as well (i.e., the female voice PCM data can used for or assigned to the outside information controller 33 while the male voice PCM data is used for or assigned to the navigation guidance messages). In this way, the user can understand by the voice tone which is output from the loudspeaker 38 whether outside information is being read aloud or whether guidance messages associated with the navigation system are being read aloud.

Figure 11:
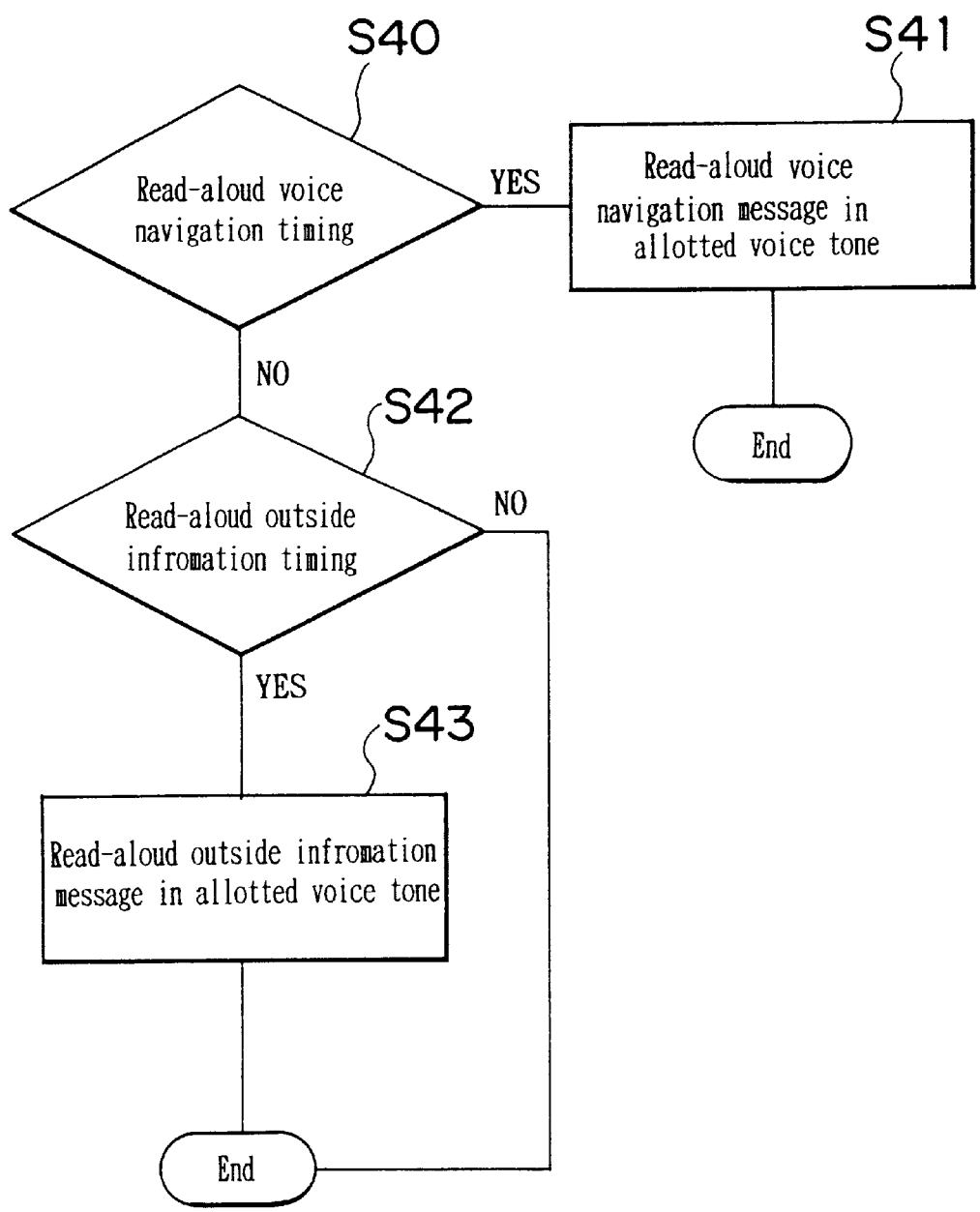
FIG. 11 is a flow chart illustrating a program process carried out to read outside information messages and voice navigation messages in different allotted voice tones.

Thus, in accordance with the present invention, the voice navigation messages providing voice guidance information to the driver of the vehicle are read aloud in a voice tone that is allotted to the voice navigation messages. Similarly, the outside information messages are read aloud in a voice tone that is allotted to the outside information messages. Further, the voice tone in which the outside information messages are read aloud differs from the voice tone in which the voice navigation messages are read aloud. FIG. 11 generally illustrates a program for reading aloud the different messages in different voice tones. In step S40, the program determines whether voice navigation messages are to be read aloud and if so, the voice navigation messages are read aloud in a voice tone allotted to the voice navigation messages in step S41. If it is determined in step S40 that voice navigation messages are not to be read aloud, it is determined in step S42 whether outside information messages are to be read aloud. If so, in step S43 the outside information messages are read aloud in the voice tone that is allotted to the outside information messages, with the voice tone allotted to the outside information messages being different from the voice tone allotted to the voice navigation messages so that the voice navigation messages and the outside information messages are read aloud in different voice tones.

This embodiment is particularly effective in situations where the vehicle is approaching one guidance intersection or one guidance point while the system is reading aloud outside information. The voice output timing is of course important for proper navigation guidance. Even if outside information is being read out, the navigation guidance message is read out in the opposite gender voice tone. Therefore, the user is able to discern that a different type of message is being read aloud and so the user is not likely to miss the navigation guidance messages while the outside information is being read aloud.

If the driver is a man, the navigation guidance message may be output in the female voice tone. If the driver is a woman, the navigation message can be output in the male voice tone. The above-mentioned voice tone setting can be performed by the user through hand-operated control. If data concerning the gender of the driver has been registered or preprogrammed, the voice tone setting can be accomplished automatically after detecting the registered gender data. It is of course also possible that various voice tones (such as a robot voice data or a juvenile voice data, etc.) can be suitably selected in addition to the gender (i.e., male or female) of the voice tone.

Figure 6:
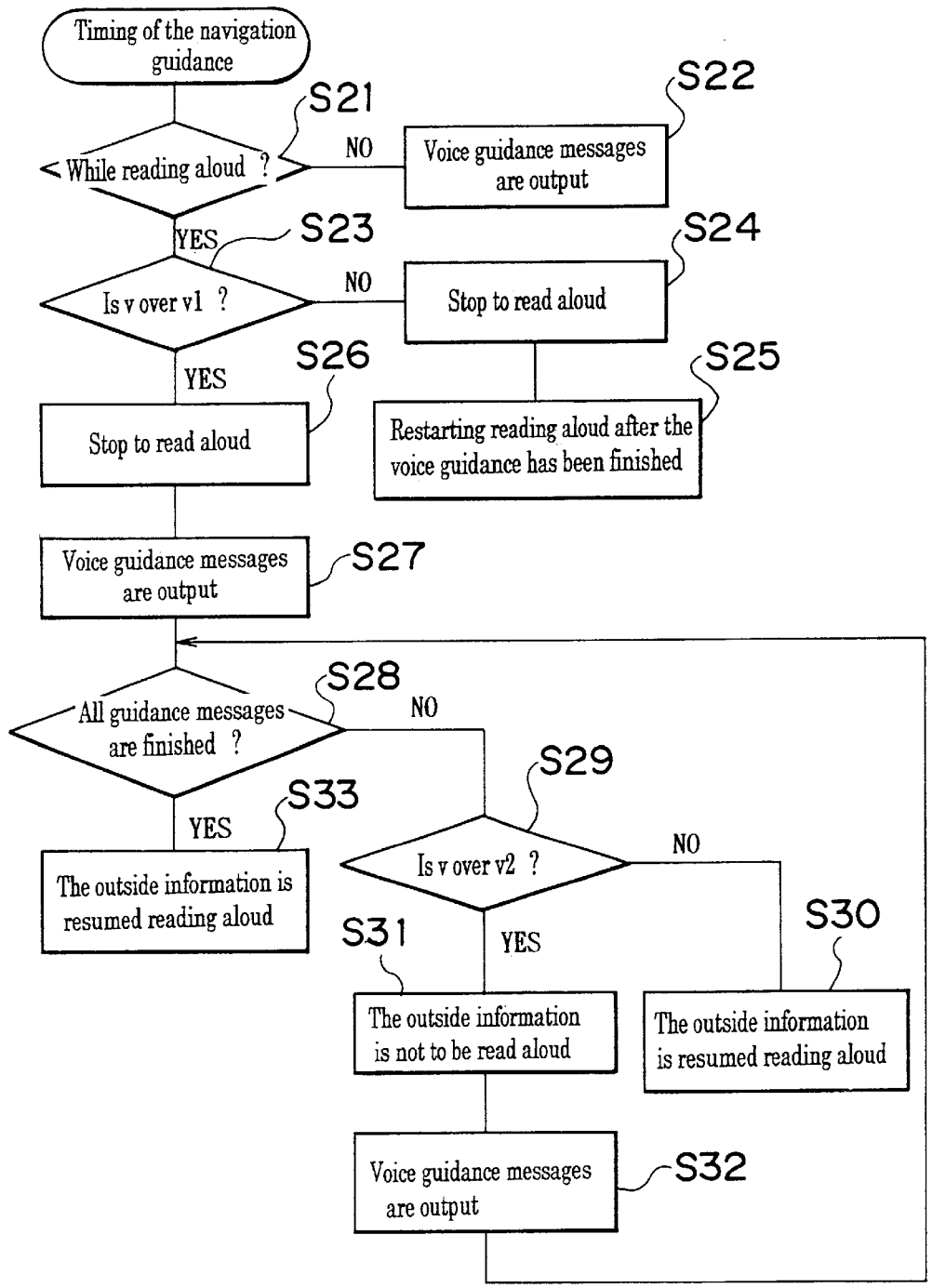
FIG. 6 is a flow chart illustrating a program process carried out in connection with operation of the second embodiment of the present invention for controlling the output timing of outside information messages and voice navigation messages.

To reduce or eliminate the possibility that a navigation guidance message and an outside information message are read at the same time, and to also ensure that the navigation guidance messages are read aloud when it is necessary, regardless of whether an outside information message is being read aloud, it is preferable that the output timing of the two types of messages be adjusted or controlled. FIG. 6 sets forth a flow chart illustrating the processing of messages to prevent the navigation guidance messages from being read aloud at the same time as the voice output for the outside information and to ensure that the navigation guidance messages are read aloud at the necessary time.

As seen initially in FIG. 6, when the vehicle is approaching a guidance intersection at which the vehicle should turn left or right, and a guidance message for navigating is to be output, a judgment is made as to whether or not an outside information message is currently being read aloud. If outside information is not currently being read aloud so that the decision in step S21 is No, the navigation voice guidance message is output from the loudspeaker in step S22. On the other hand, if outside information is currently being read aloud, the program proceeds to step S23 where it is judged whether or not the velocity (v) of the vehicle is greater than a first predetermined value (v1). The first predetermined value (v1) may be set from 10 km/h to 20 km/h, for example. If the velocity (v) of the vehicle is not in excess of the first predetermined value (v1), it is considered that the vehicle is not traveling too fast. The program then proceeds to step S24 where the reading aloud of the outside information message is temporarily stopped to read aloud the voice guidance message, and then the reading aloud of the outside information is restarted in step S25 after the voice guidance messages are finished. Preferably, the outside information that is interrupted at step S24 should be read aloud from the beginning because it might otherwise be difficult for the user to understand the entirety of the outside information if it is read aloud from some midway point. However, it is also possible to control the system to once again begin reading aloud the outside information from the point of interruption by using the operating device 22 in FIG. 5. Depending upon the nature of the outside information and the amount of the outside information message that has already been read aloud, the user can decide to pick up with the outside information at the point of interruption by operating the operating device 22.

Instead of detecting the vehicle velocity (v) at step S23, traffic information relating to the average passage time of the road can be relied upon. Such traffic information system has been put to practical use in Japan. The system is called VICS (Vehicle Information Communication System) and can provide the traffic information from the FM radio wave or traffic information beacons.

Figure 7:
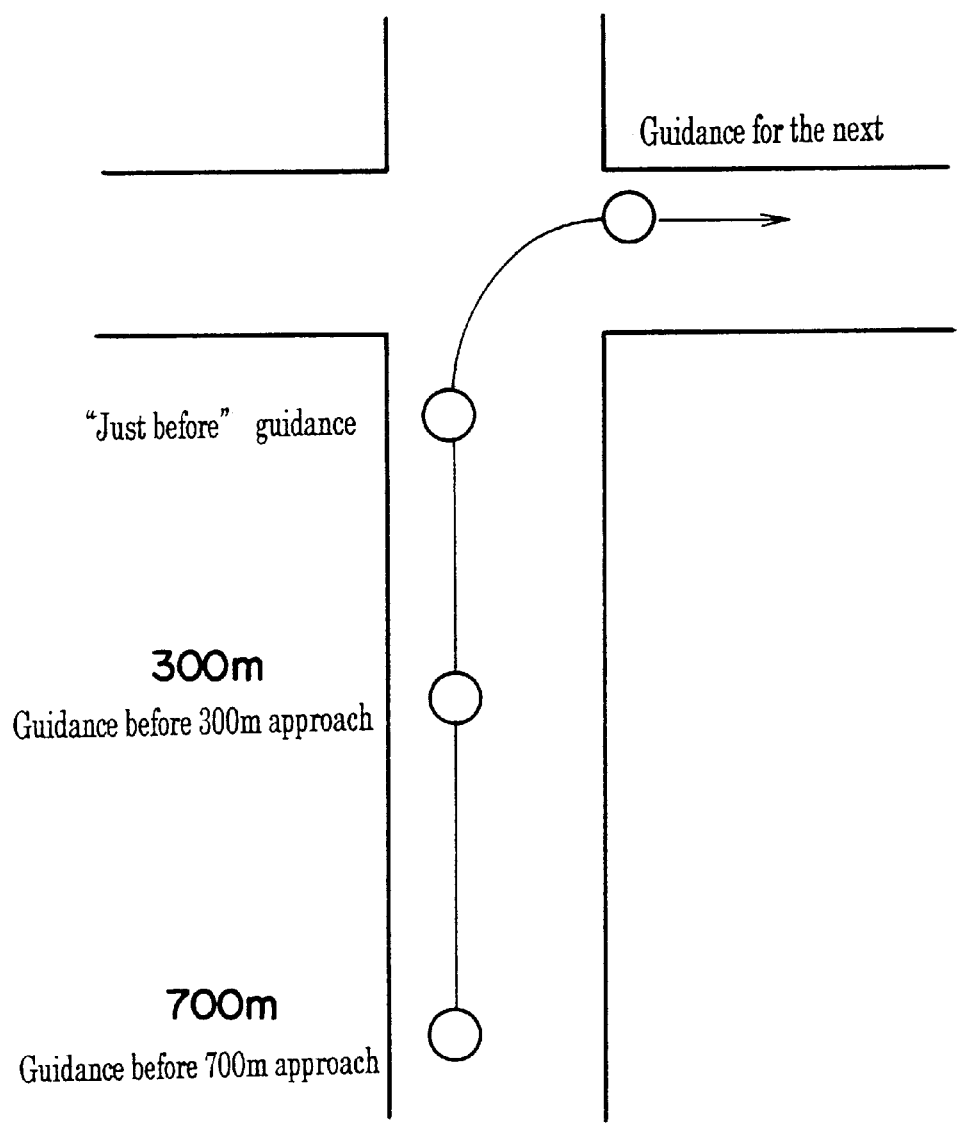
FIG. 7 is a schematic illustration of guidance information provided in accordance with the present invention.

If the determination in step S23 is Yes because the vehicle is traveling at a relatively high rate of speed for purposes of navigation guidance, the reading aloud of the outside information is stopped in step S26 and the navigation voice guidance message is output from the loudspeaker 38 in step S27. Then, in step S28, it is determined whether or not all voice guidance messages have been read aloud. As an alternative, this step can be substituted for a step of determining whether or not the vehicle has passed the guidance intersection. Normally, several guidance messages are prepared and outputted for a particular guidance intersection in order to give the driver advanced guidance. For example, FIG. 7 shows an example in which a driver is given four guidance messages to negotiate a turn at a single guidance intersection. A first guidance message is outputted at approximately 700 meters before the guidance intersection. The second guidance message is outputted approximately 300 meters before the guidance intersection. The third guidance message is outputted just before reaching the intersection. The fourth and final guidance message is outputted after turning and passing through the intersection to provide the driver with information concerning the next intersection or the next road. Although the fourth guidance message is not always necessary, it may sometimes provide helpful information to the driver.

If the determination in step S28 is that all of the guidance messages are not finished being read aloud, it is determined in step S29 whether the vehicle velocity (v) is greater than a second predetermined value (v2). The second predetermined value (v2) can be on the order of 0 km/h to about 5 km/h. If the vehicle velocity (v) does not exceed the predetermined value (v2) in step S29 after the determination in step S23 that the vehicle speed is in excess of the first predetermined velocity (v1), thus indicating that the vehicle is stopped or is caught in a heavy traffic jam, the reading aloud of the outside information is resumed, preferably from the beginning, in step S30. If it is determined in step S29 that the vehicle speed is in excess of the second predetermined velocity (v2), the outside information continues to not be read aloud in step S31 and the navigation guidance messages continue to be output in step S32. Thereafter, the process returns to step S28.

If the determination at step S28 is that all of the voice guidance messages have been outputted, the outside information may be read aloud again, preferably from the beginning, in step S33.

As above mentioned, if the velocity is not relatively low (i.e., is in excess of v1) and if all the navigation guidance messages for one intersection are not finished being read aloud, the outside information is kept from being read aloud. Therefore, while the vehicle is moving smoothly before the guidance intersection, the voice guidance messages for navigating the vehicle are outputted without the outside information being simultaneously outputted. However, when the vehicle velocity is relatively low (i.e., below the velocity v1) and the vehicle is stopped or is caught in a traffic jam, even if all of the navigation guidance messages have not been read out, the outside information can be read aloud in the interval between each voice guidance message. Therefore, the user doesn't have to wait excessively long between successive voice guidance messages to have the outside information read aloud.

In addition, the voice tone for the navigation guidance messages is different from the voice tone for reading the outside information and so it is easy for the driver to recognize which kinds of messages are being read aloud. Furthermore, the screen contents of the display device 35 can be adapted to correspond to the voice messages. For example, while the outside information is being read aloud, the outside information can be displayed on the screen. On the other hand, while the voice guidance messages for navigating the driver are being outputted, map data about the guidance intersection can be displayed on the display device 35.

The outside information controller and the navigation controller are constituted by a computer system and are controlled by a controlling program(s) in the computer system so that the processes are generally maintained by running the predetermined program(s). This program(s) can be pre-installed on the computer system, or can be supplied to the computer system through an on-line network or some medium like a CD-ROM, for example. In this way, the reading aloud of the different messages in different voice tones can be achieved as can the control of the output timing of the various messages.

Figure 8:
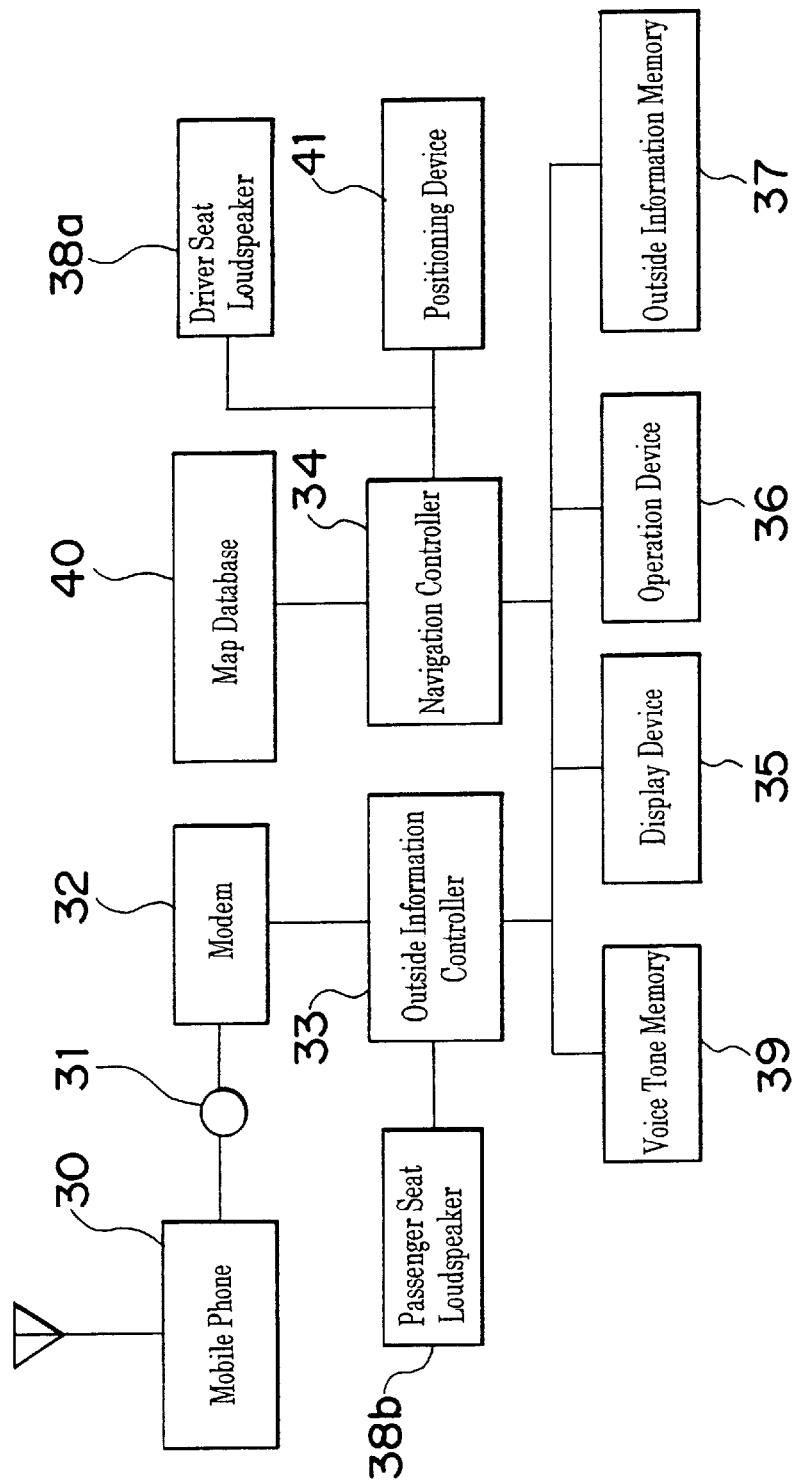
FIG. 8 is a block diagram illustrating the configuration of a system representing a variation on the embodiment shown in FIG. 5.

FIG. 8 shows a slightly modified version of the mobile terminal shown in FIG. 4 in which a passenger seat loudspeaker 38b is connected to the outside information controller 33 and a driver seat loudspeaker 38a is connected to the navigation controller 34. The navigation controller 34 can use female voice tone data for outputting its guidance messages while the output information controller 33 uses male voice tone data for reading aloud its information, for example, e-mail messages, weather report information, traffic information, news information, business information, etc. The voice tone data for navigating the driver may be supplied from the map database 40 instead of the voice tone memory 39. In this case, when the voice guidance timing is operational, the navigation controller 34 acquires voice tone data from the map database 40 and outputs the navigation guidance messages through the loudspeaker 38a installed near the driver's seat. The outside information controller 33 can acquire voice tone data from the voice tone memory 39, formulate the necessary text (sentences) to be read aloud and then output the outside information through the loudspeaker 38b installed near the passenger's seat. Of course, it is also possible to use male voice tone data for the navigation guidance message and female voice tone data for reading aloud the outside information.

The outside information controller 33 and the navigation controller 34 can be used to control the output of the above-mentioned navigation guidance voice and the communication messages voice, with the two controllers 33, 34 forming separate units and separate electrical circuits. It is also possible to place the outside information controller 33 and the navigation controller 34 in a single unit or case with separate electrical circuitry. Further, one electrical controller can be provided with both the outside information controlling programs and the navigation controlling programs to form a single unit with one electrical circuitry.

Figure 9:
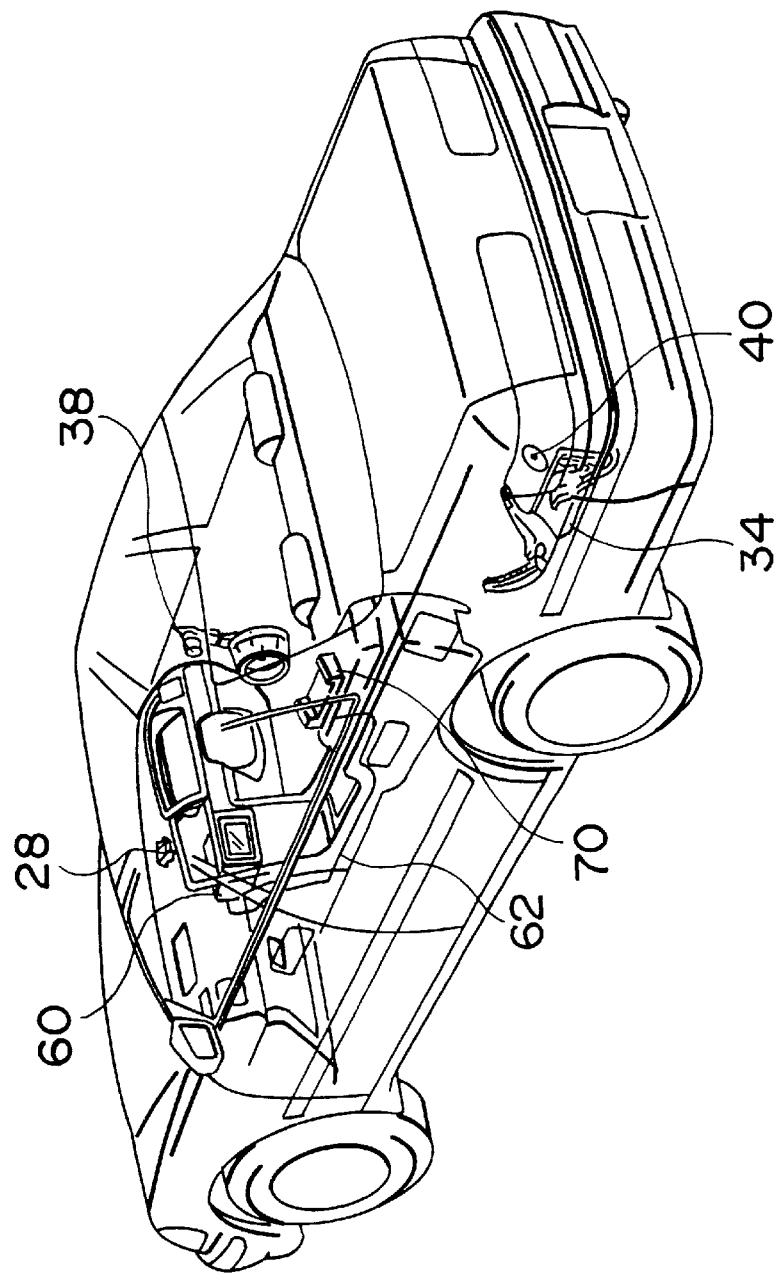
FIG. 9 is a perspective view of a vehicle illustrating a way in which the mobile terminal device according to the present invention can be installed in the vehicle.

FIG. 9 shows one example for installing the mobile terminal on a vehicle. In the case of the positioning device 41 being in the form of a GPS antenna, the GPS antenna 28 is mounted on the upper part of the instrument panel in the vehicle's cabin. An electrical controller unit functioning as the navigation controller 34 can include CD-ROMS as the map database 40 and such unit can be installed in the trunk of the vehicle. Another ECU serving as the operating device 36, the display device 35 and the outside information controller 33, generally referred to as a multimedia station device 60, is mounted in the space between the driver seat and the passenger seat. The loudspeaker 38 is connected to the multimedia station 60.

Figure 10:
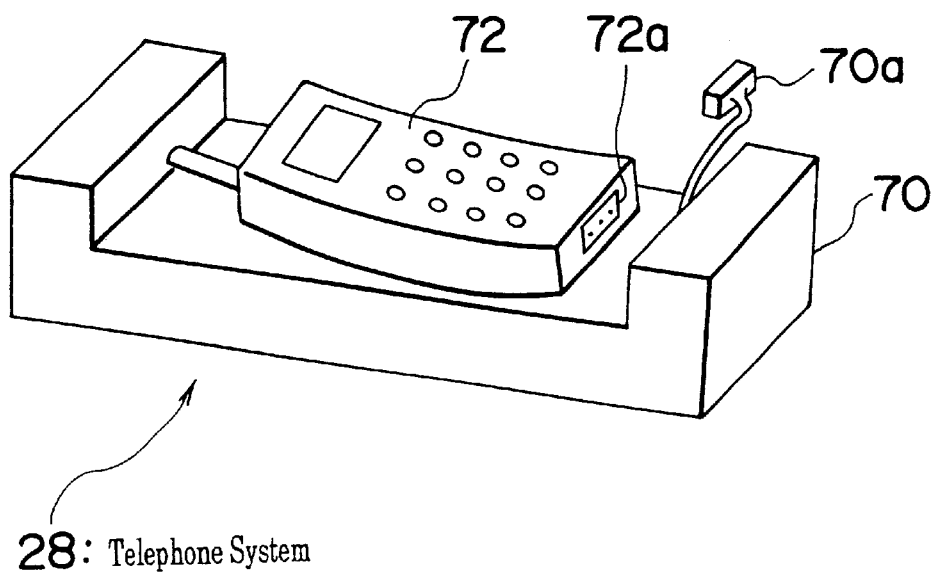
FIG. 10 is a perspective view of a communication device that includes a mobile phone terminal.

As shown in FIG. 9, the loudspeaker 38 is installed near the driver's seat. Another loudspeaker can also be installed on the passenger side of the vehicle. The mobile phone system 72 shown in FIG. 10 is connected to the multimedia station 60 through cables 62. The mobile phone system 72 is placed on a cradle device 70. The speaker system and microphone system are connected with the multimedia station 60. Without having a receiver, the user can call by placing the phone on the cradle 70.

FIG. 10 shows the cradle device 70 in more detail. The mobile phone 72 can be placed on the surface of the cradle 70, with the cradle device 70 and the terminal of the mobile phone 72 being connected through a connector 70a.

It can thus be seen that by virtue of the present invention, different voice tones are assigned to different messages, or the senders or sources of different messages, to allow the user or receiver to discern between different messages or between different senders or sources of messages. The system can also be adapted to detect the address data of each sender to advantageously facilitate the sorting of messages. The reading aloud of different messages can be made easier by selecting one voice tone from a memory to read aloud one kind of message and selecting another voice tone to read aloud another kind of message.

The present invention also compares the number of memorized voice tones and the number of senders of received messages, and then sequentially reads aloud messages that can be read without repetitively using the same voice tone, thus preventing one voice tone from being used repeatedly for the messages of different senders during one reading aloud sequence.

The present invention can also be designed to advantageously memorize an assigned relationship between one voice tone and a sender or source who has sent a message or messages after the voice tone has been assigned to the sender or source, and then prioritizes the use of that voice tone for messages received from such sender or source. Thus, to the extent messages are frequently received from one sender or source, the system can easily and automatically allot the same voice tone to messages received from that sender or source.

The present invention also provides a system which is able to read aloud both outside information messages as well as navigation guidance information messages, with different voice tone data being assigned to the received outside information and the navigation guidance information so that the driver can easily distinguish between the two types of information being read aloud. The system memorizes different types of voice tone date (e.g., female and male voice tone data) and advantageously assigns one voice tone data to received message information and a different voice tone data to the navigation guidance information so that the two types of information are read aloud using different voice tones.

The system according to the present invention is further advantageous in that the output timing of outside information and the output timing of voice navigation guidance information is adjusted for purposes of reducing the possibility of reading aloud the two types of information at the same time, while also ensuring that the voice navigation guidance information is provided at the necessary time.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A message processing device comprising:

receiving means for receiving electronic messages sent from outside by senders;

a voice tone memory for storing a plurality of different voice tones;

sorting means for sorting all electronic messages received by said receiving means into groups;

allotting means for allotting one of said plurality of voice tones stored in said voice tone memory to each of the electronic messages in one group and allotting a different one of said plurality of voice tones stored in said voice tone memory to each of the electronic messages in another of the groups;

comparing means for comparing the number of voice tones stored in the voice tone memory with the number of different groups of received electronic messages;

voice reading means for reading aloud electronic messages sequentially that are able to be read aloud without repeating use of the same voice tone for different groups, with said electronic messages in the one group being read aloud in the one voice tone and said electronic messages in the another group being read aloud in the different voice tone.

2. A message processing device in accordance with claim 1, wherein a sender's address data is associated with each of the electronic messages received by the receiving means, said sorting means being adapted to detect the address data of each electronic message and sort the electronic messages based on the sender's address data.

3. A message processing device in accordance with claim 1, including means for memorizing an assigned relation between the one voice tone and the sender of the electronic messages in the one group after the allotting means has assigned a voice tone to all electronic messages received from said sender, means for prioritizing use of a voice tone for all subsequent messages received from the same sender after said memorizing means has memorized the assigned relation between the one voice tone and the sender.

4. A message processing device in accordance with claim 1, wherein said voice reading means reads a message sent from outside and a guidance message related to positioning on a navigation, and said sorting means sorts the message sent from outside and the guidance message related to positioning on the navigation into groups.

5. A message processing device according to claim 1, wherein if the comparing means determines that the number of different groups of received electronic messages is equal to or smaller than the number of voice tones stored in the voice tone memory, a respective different voice tone is allotted to each group of electronic messages and the electronic messages in each group are read aloud in said respective tone.

6. A message processing device according to claim 1, wherein if the comparing means determines that the number of different groups of received electronic messages is greater than the number of voice tones stored in the voice tone memory, a number of groups equal to the number of voice tones stored in the voice tone memory is extracted from all of the groups of received electronic messages and a respective different voice tone is allotted to each of the extracted groups, and the number of remaining groups not extracted is compared with the number of voice tones stored in the voice tone memory.

7. A message processing device according to claim 1, wherein each group of electronic messages contains electronic messages sent by at least the same sender.

8. A message processing method, comprising:
receiving messages sent from outside by senders;
sorting all received messages into groups;
comparing the number of voice tones stored in a voice tone memory with the number of different groups of received messages;
allotting one of the voice tones stored in the voice tone memory to said messages in one group and allotting a different one of the voice tones stored in the voice tone memory to the messages in a second one of the groups;
reading aloud messages sequentially that are able to be read aloud without repeating use of the same voice tone for different groups, with said messages in the one group being read aloud in said one voice tone and said messages in the second group being read aloud in said different voice tone.

9. A message processing method in accordance with claim 8, wherein said messages each have associated therewith address data indicating an address of the sender, said step of sorting including sorting the messages into groups based on the address of the sender.

10. A message processing method in accordance with claim 8, wherein said step of allotting one voice tone to the at least one message includes allotting the one voice tone to a sender of the at least one message, and including memorizing an assigned relation between the one voice tone and said sender after the one voice tone has been allotted to the sender, and prioritizing allotment of said one voice tone to messages received from said sender after the assigned relation between the one voice tone and said sender has been memorized.

11. A message processing method in accordance with claim 8, wherein said step of reading includes reading a message sent from outside and a guidance message related to positioning on a navigation, and said step of sorting includes sorting the message sent from outside and the guidance message related to positioning on the navigation into groups.

12. A message processing method according to claim 8, wherein if the number of different groups of received messages is equal to or smaller than the number of voice tones stored in the voice tone memory, a respective different voice tone is allotted to each group of electronic messages and the electronic messages in each group are read aloud in said respective tone.

13. A message processing method according to claim 8, wherein if the number of different groups of received messages is greater than the number of voice tones stored in the voice tone memory, a number of groups equal to the number of voice tones stored in the voice tone memory is extracted from all of the groups of received messages and a respective different voice tone is allotted to each of the extracted groups, and the number of remaining groups not extracted is compared with the number of voice tones stored in the voice tone memory.

14. A message processing method according to claim 8, wherein each group of messages contains messages sent by at least the same sender.

15. A computer readable medium including a message processing program that performs the steps of:
receiving a plurality of messages from different sources;
sorting the messages into different groups;
comparing the number of voice tones stored in a voice tone memory with the number of different groups of received messages;
allotting a first of the voice tones stored in the voice tone memory to a first one of the groups of received messages and allotting a second one of the voice tones stored in the voice tone memory that is different from the first voice tone to a second one of the groups of received messages;
reading aloud messages sequentially that are able to be read aloud without repeating use of the same voice tone for different groups, with the messages in the first group being read aloud using the first voice tone and the messages in the second group being read aloud using the second voice tone.

16. A computer readable medium according to claim 15, wherein the reading aloud of the messages in the first group includes reading aloud electronic messages sent from a first sender, and the reading aloud of the messages in the second group includes reading aloud electronic messages sent from a second sender that is different from the first sender.

17. A computer readable medium according to claim 15, wherein the reading aloud of the messages in the first group includes reading aloud electronic messages sent from outside and the step of reading aloud the messages in the second group includes reading aloud vehicle navigation guidance messages.

18. A computer readable medium according to claim 15, wherein the message processing program allots the first voice tone to the messages in the first group prior to reading aloud said messages in the first group, and allots the second voice tone to the messages in the second group prior to reading aloud said messages in the second group.

19. A computer readable medium according to claim 15, wherein if it is determined that the number of different groups of received messages is equal to or smaller than the number of voice tones stored in the voice tone memory, a respective different voice tone is allotted to each group of electronic messages and the electronic messages in each group are read aloud in said respective different tone.

20. A computer readable medium according to claim 17, wherein if it is determined that the number of different groups is greater than the number of voice tones stored in the voice tone memory, a number of groups equal to the number of voice tones stored in the voice tone memory is extracted from all of the groups of received messages and a respective different voice tone is allotted to each of the extracted groups, and the number of remaining groups not extracted is compared with the number of voice tones stored in the voice tone memory.

21. A computer readable medium according to claim 6, wherein the messages are sorted into the groups based on the source so that at least all messages from the same source are in the same group.

* * * * *